United States Patent
Jie

(10) Patent No.: US 10,518,438 B2
(45) Date of Patent: Dec. 31, 2019

(54) METHODS OF ADDITIVE MANUFACTURING FOR CERAMICS USING MICROWAVES

(71) Applicant: Applied Materials, Inc., Santa Clara, CA (US)

(72) Inventor: Zeng Jie, Singapore (SG)

(73) Assignee: Applied Materials, Inc., Santa Clara, CA (US)

(*) Notice: Subject to any disclaimer, the term of this patent is extended or adjusted under 35 U.S.C. 154(b) by 266 days.

(21) Appl. No.: 15/467,541

(22) Filed: Mar. 23, 2017

(65) Prior Publication Data

US 2017/0282400 A1 Oct. 5, 2017

Related U.S. Application Data

(60) Provisional application No. 62/315,516, filed on Mar. 30, 2016.

(51) Int. Cl.
| | | |
|---|---|---|
| *B28B 1/00* | (2006.01) | |
| *B33Y 10/00* | (2015.01) | |
| *B33Y 30/00* | (2015.01) | |
| *B33Y 50/02* | (2015.01) | |

(52) U.S. Cl.
CPC ............... *B28B 1/001* (2013.01); *B33Y 10/00* (2014.12); *B33Y 30/00* (2014.12); *B33Y 50/02* (2014.12)

(58) Field of Classification Search
CPC .................................................... B28B 11/214
See application file for complete search history.

(56) References Cited

U.S. PATENT DOCUMENTS

| 9,155,597 B2 | 10/2015 | Brodkin et al. |
| 2003/0094734 A1* | 5/2003 | Deckard ................ B29C 70/00 264/425 |
| 2005/0023710 A1* | 2/2005 | Brodkin ............. A61C 13/0003 264/16 |

(Continued)

FOREIGN PATENT DOCUMENTS

| EP | 2359958 | 8/2011 |
| EP | 2851180 | 3/2015 |

OTHER PUBLICATIONS

Chartier et al., "Additive manufacturing to produce complex 3D ceramic parts," Journal of Ceramic Science and Technology, 2015, 6: 95-104.

(Continued)

*Primary Examiner* — Joseph A Miller, Jr.
(74) *Attorney, Agent, or Firm* — Fish & Richardson P.C.

(57) ABSTRACT

An additive manufacturing apparatus for forming a ceramic part includes a platform to support the ceramic part to be formed and a dispenser to dispense successive layers of feed material over the platform. The feed material includes a curable component. The apparatus further includes a radiation source to emit a radiation toward a top surface of the platform and a microwave source to apply microwaves directed toward the successive layers on the platform. The radiation is configured to cure the curable component of the feed material as or after each layer is dispensed. The microwaves are configured to vaporize the curable component of the feed material and to cause crystallization of the feed material to form the ceramic part.

16 Claims, 6 Drawing Sheets

(56) References Cited

U.S. PATENT DOCUMENTS

| | | | | |
|---|---|---|---|---|
| 2007/0146734 | A1* | 6/2007 | Taniuchi | B33Y 30/00 |
| | | | | 358/1.1 |
| 2009/0267264 | A1* | 10/2009 | Tranter | B29C 35/0266 |
| | | | | 264/234 |
| 2010/0111744 | A1* | 5/2010 | Schleiss | B22F 3/1055 |
| | | | | 419/5 |
| 2011/0204548 | A1* | 8/2011 | George | F26B 3/347 |
| | | | | 264/638 |
| 2012/0228803 | A1 | 9/2012 | Smoke et al. | |
| 2012/0308837 | A1 | 12/2012 | Schlechtriemen et al. | |
| 2014/0061974 | A1* | 3/2014 | Tyler | B29C 64/209 |
| | | | | 264/401 |

OTHER PUBLICATIONS

International Search Report and Written Opinion in Application No. PCT/US2017/0238047, dated Jun. 26, 2017, 13 pages.

\* cited by examiner

METHODS OF ADDITIVE MANUFACTURING FOR CERAMICS USING MICROWAVES

CROSS-REFERENCE TO RELATED APPLICATIONS

This application claims priority to U.S. Provisional Application Ser. No. 62/315,516, filed Mar. 30, 2016, the disclosure of which is incorporated by reference.

TECHNICAL FIELD

This specification relates to additive manufacturing, also known as 3D printing, for ceramics.

BACKGROUND

Additive manufacturing (AM), also known as solid free form fabrication or 3D printing, refers to a manufacturing process where three-dimensional objects are built up from successive dispensing of raw material (e.g., powders, liquids, suspensions, or molten solids) into two-dimensional layers. In contrast, traditional machining techniques involve subtractive processes in which objects are cut out from a stock material (e.g., a block of ceramic, wood, plastic).

A variety of additive processes can be used in additive manufacturing. Some methods melt or soften material to produce layers, e.g., selective laser melting (SLM) or direct metal laser sintering (DMLS), selective laser sintering (SLS), fused deposition modeling (FDM), while others cure liquid materials using different technologies, e.g. stereolithography (SLA). These processes can differ in the way layers are formed to create the finished objects and in the materials that are compatible for use in the processes.

Conventional systems use an energy source for sintering or melting a powdered material. Once all the selected locations on the first layer are sintered or melted and then re-solidified, a new layer of powdered material is deposited on top of the completed layer. The process can then be repeated layer by layer until the desired object is produced.

SUMMARY

In one aspect, an additive manufacturing apparatus for forming a ceramic part includes a platform to support the ceramic part to be formed and a dispenser to dispense successive layers of feed material over the platform. The feed material includes a curable component. The apparatus further includes a radiation source to emit a radiation toward a top surface of the platform and a microwave source to apply microwaves directed toward the successive layers on the platform. The radiation is configured to cure the curable component of the feed material as or after each layer is dispensed. The microwaves are configured to vaporize the curable component of the feed material and to cause crystallization of the feed material to form the ceramic part.

In a further aspect, an additive manufacturing apparatus for forming a ceramic part includes an enclosure, an additive manufacturing module housed in the enclosure, a microwave module housed in the enclosure, and a controller. The additive manufacturing module is configured to dispense and cure successive layers of a feed material on a platform. The microwave module is configured to emit microwaves to cause crystallization of the feed material to form the ceramic part. The controller is configured to operate the additive manufacturing module to dispense and cure layers of the feed materials to form a cured polymer. The controller is configured to operate, after the layers of the feed material are dispensed and cured, the microwave module to vaporize the cured polymer and to cause crystallization of the feed material to form the ceramic part.

In another aspect, an additive manufacturing method for forming a ceramic part includes dispensing successive layers of feed material, emitting a radiation toward at least one layer of the feed material as or after each layer of the successive layers is dispensed, and applying microwaves directed toward the successive layers. The feed material includes a curable component. The radiation is configured to cure the curable component of the feed material. The microwaves are configured to vaporize the curable component of the feed material and to cause crystallization of the feed material to form the ceramic part.

In yet another aspect, an additive manufacturing method includes dispensing a first layer of a first feed material that includes a curable component and a ceramic component. The method further includes emitting a radiation toward the first layer of the first feed material to cure the curable component of the first feed material in the first layer. The method includes dispensing a second layer of a second feed material on the first layer. The second feed material includes the curable component and the ceramic component. The method further includes emitting the radiation toward the second layer of the second feed material to cure the curable component of the second feed material in the second layer. The method also includes dispensing a third layer of the first feed material on the second layer of the second feed material and emitting the radiation toward the third layer of the first feed material to cure the curable component of the first feed material in the third layer. The method includes applying microwaves to multiple layers including at least the first, second, and third layers to crystallize and sinter the ceramic component of the feed material of the multiple layers.

Implementations of the apparatuses and methods may include those described below and elsewhere herein. In some examples, the apparatus can include a controller configured to cause the dispenser to dispense at least two layers of feed material between each application of the microwaves such that the microwaves vaporize the curable component of the at least two layers of feed material simultaneously. The method can further include dispensing at least two layers of the feed material before applying the microwaves. Applying the microwaves can include applying the microwaves to vaporize the curable component of the at least two layers of the feed material simultaneously. Alternatively or additionally, the apparatus can include a controller configured to cause the microwave source to apply the microwaves to vaporize simultaneously the curable component of the successive layers of the feed material after causing the dispenser to dispense all of the successive layers of the feed material. Applying the microwaves can include applying the microwaves to vaporize simultaneously the curable component of the layers of the feed material after dispensing all of the successive layers of the feed material.

In some examples, the additive manufacturing apparatus further comprises a controller configured to cause the microwave source to apply the microwaves to cause growth of a ceramic crystal transparent to the microwaves to form the ceramic part. Applying the microwaves can cause growth of a ceramic crystal transparent to the microwaves to form the ceramic part. The radiation can be configured to cure the curable component to form a cured polymer. Emitting the radiation can include applying the radiation to the feed material to cure the curable component of the feed material to form a cured polymer. The ceramic crystal can have a transparency to the microwaves 400% to 2000% greater than a transparency to the microwaves of the cured polymer.

In some examples, the microwave source can be configured to emit the microwaves at multiple frequencies. The microwave source can be configured to sequentially emit the microwaves at each of the frequencies. Applying the microwaves can include emitting the microwaves at multiple frequencies. Emitting the microwaves at the frequencies can include sequentially emitting the microwaves at each of the frequencies. The frequencies can be between 5.8 and 6.8 gigahertz. The microwave source can emit the microwaves at each of the frequencies for approximately 25 microseconds. Emitting the microwaves at the frequencies can include emitting the microwaves at each of the frequencies for approximately 25 microseconds. In some cases, the microwave source can emit the microwave at each of the frequencies for 5 microseconds to 45 microseconds. Emitting the microwaves at the frequencies can include emitting the microwaves at each of the frequencies for 5 microseconds to 45 microseconds.

In some examples, the radiation source can be an ultraviolet (UV) light source and the radiation is ultraviolet light. Emitting the radiation can include emitting ultraviolet light toward the at least one layer of the feed material as or after dispensing each layer of the successive layers. The curable component of the feed material can include a UV light curable polymer.

In some examples, the feed material can include a ceramic component. The microwave source can be configured to emit the microwave toward the platform to cause crystallization of the ceramic component. Applying the microwaves can cause crystallization of the ceramic component. The ceramic component can include a liquid-phase ceramic compound. The ceramic component of the feed material can include a first precursor material and a second precursor material. The microwave source can be configured to emit the microwave toward the platform to cause the first precursor material and the second precursor material to form a ceramic compound. Applying the microwaves can cause the first precursor material and the second precursor material to form a ceramic compound. The first precursor material can include carbon, and the second precursor material can include silicon.

Additionally or alternatively, the feed material can be a first feed material, and the dispenser can be configured to dispense the first feed material and a second feed material on the top surface of the platform. Each of the first feed material and the second feed material can include the ceramic component and the curable component. The microwave source can be configured to crystalize the ceramic component of the first feed material to form first ceramic crystals and to crystalize the ceramic component of the second feed material to form second ceramic crystals. Applying the microwaves can cause crystallization of the ceramic component of the first feed material to form a first ceramic crystal and crystallization of the ceramic component of the second feed material to form a second ceramic crystal. The first crystals can be larger than the second crystals. The first crystals can be 300% to 2000% larger than the second crystals. A ratio of the ceramic component to the curable component of the first feed material can be greater than a ratio of the ceramic component to the curable component of the second feed material. For example, the ratio of the first feed material can be 600% to 1000% greater than the ratio of the second feed material.

In some cases in which a first feed material and a second feed material are dispensed, the apparatus can further include a controller. The controller can be configured to cause the apparatus to dispense, using the dispenser, a first layer of the first feed material on the top surface of the platform, and to cure, using the radiation source, the first layer of the first feed material. The controller can be configured to dispense, using the dispenser, a second layer of the second feed material on the first layer, and to cure, using the radiation source, the second layer of the second feed material. The controller can be further configured to dispense, using the dispenser, a third layer of the first feed material on the second layer, and cure, using the radiation source, the third layer of the first feed material. The controller can yet further be configured to sinter, using the microwave source, multiple layers including at least the first, second, and third layers.

In some cases in which a first feed material and a second feed material are dispensed, the method can further include dispensing the first layer of the first feed material and emitting the radiation toward the first layer of the first feed material. The method can include dispensing the second layer of the second feed material on the first layer and emitting the radiation toward the second layer of the second feed material. The method can also include dispensing the third layer of the first feed material on the second layer and emitting the third layer of the first feed material. The method can include sintering the layers including at least the first, second, and third layers.

In some examples, the apparatus can include an enclosure opaque to the microwaves. The enclosure can support the platform and separate the microwaves emitted by the microwave source from an environment. Emitting the microwaves can include emitting the microwaves such that the microwaves are contained within an enclosure separating the microwaves from an environment of the enclosure.

In some examples, the apparatus can include a window opaque to the microwaves and transparent to at least infrared light. Emitting the microwaves can include emitting the microwaves such that the microwaves are contained within the enclosure and a window of the enclosure. The window can be opaque to the microwaves and transparent to at least infrared light. The apparatus can include an infrared thermal sensor to emit infrared radiation through the window toward the top surface of the platform. The infrared thermal sensor can be configured to detect a temperature of the feed material on the platform. The method can further include emitting infrared radiation through the window to detect a temperature of the feed material.

In some examples, the apparatus can include a horn coupled to the microwave source. Emitting the microwaves can include emitting the microwaves through a horn. The horn can be shaped to guide the microwaves emitted by the microwave source to a portion of the top surface of the platform.

In some examples, the ceramic part is a silicon carbide monolith.

In some examples, the ceramic part is a tungsten carbide monolith.

The implementations described herein may optionally include (and are not limited to) the advantages described below. The additive manufacturing apparatuses and method can reduce material waste that typically occurs with subtractive methods for forming a ceramic part. For example, traditional machining methods can remove ceramic material from a stock ceramic workpiece to form the ceramic part, and the removed ceramic material, in some cases, cannot be reused. In contrast, in the additive manufacturing apparatuses and methods described herein, the ceramic component in the feed material dispensed to form the successive layers is not removed, but rather, is used to form the ceramic part.

The viscosity of the feed material delivered can be adjusted by selecting a proportion of non-ceramic component in the feed material. In cases where the ceramic component is a liquid-phase ceramic compound, the viscosity of the liquid-phase ceramic compound alone can result in slower dispensing speeds and clogging. In the present additive manufacturing apparatus and methods, the feed material can be tailored to have a lower viscosity such that any equipment in a flow path of the feed material is less likely to suffer from clogs that could occur when the viscosity is higher. The lower viscosity of the feed material can furthermore expedite the throughput of formation of ceramic parts by increasing the rate at which the feed material can be dispensed.

Microwaves can increase the rate of crystallization of the ceramic component, particularly when compared to heat-based methods that do not use microwaves. When microwaves are applied at multiple frequencies, a more uniform energy and heat distribution throughout the layer of the feed material can be achieved. The uniformity of energy and heat can increase the uniformity of vaporization of the curable component and crystallization of the ceramic component. The more uniform heat and energy distribution to the ceramic component can lead to a smoother finish for the ceramic part. Without being limited by a particular theory, the increased uniformity may be due to the microwaves causing multi-modal responses from the curable component and the ceramic component of the feed material.

When multiple types of feed materials are dispensed, the multiple types of feed materials can facilitate improved bonding between dispensed layers. In particular, the feed materials, by having different compositions and ceramic component contents, form smaller and larger crystal grains. The crystalline structure formed from a combination of smaller and larger crystal grains is stronger as compared to a crystalline structure with a greater homogeneity of crystal grain size.

The details of one or more implementations of the subject matter described in this specification are set forth in the accompanying drawings and the description below. Other potential aspects, features, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

An additive manufacturing (AM) apparatus can be used to perform manufacturing processes to form a ceramic part by dispensing and fusing successive layers of feed material. The apparatus can use a first process to cure portions of the feed material, thereby stabilizing the feed material after it has been dispensed. The apparatus can use a second process to cause crystallization of the stabilized feed material and to remove other materials from the feed material that do not form the ceramic part.

Stabilization of the feed material through curing and crystallization of the feed material through exposure to microwaves can be processes that can differentially affect different components of the feed material. In some examples, the curing process can include emitting a radiation that cures a curable component of the feed material, and the crystallization process can include, for example, emitting a radiation that causes the crystallization of a ceramic component of the feed material.

The curing radiation can include ultraviolet light, and the feed material can include a photosensitive polymer that cures in response to exposure to the curing radiation. The crystallization radiation can include microwaves, and the feed material can include one or more ceramic components that crystallize to form the ceramic part in response to the microwaves. In some examples, a ceramic crystal formed from the microwaves can be transparent to the microwaves whereas the cured polymers are opaque to the microwaves. The microwaves consequently can impart energy to the cured polymers to vaporize the cured polymers without burning the ceramic crystal. As a result, a significant portion of the non-ceramic component of the feed material can be removed such that the ceramic crystal can form a ceramic part having ceramic material characteristics. For example, substantially only the ceramic crystal can remain after the sequential curing and crystallization processes.

Additive Manufacturing Apparatuses

Figure 1:
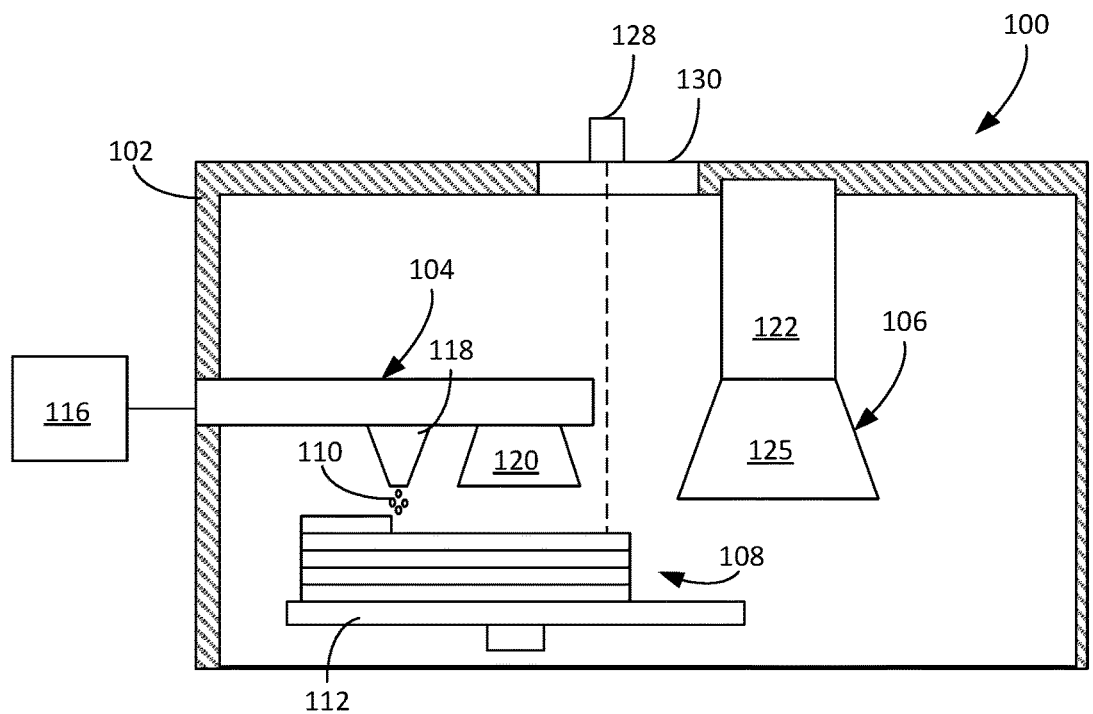
FIG. 1 is a schematic side view of an additive manufacturing apparatus.
Figure 2:
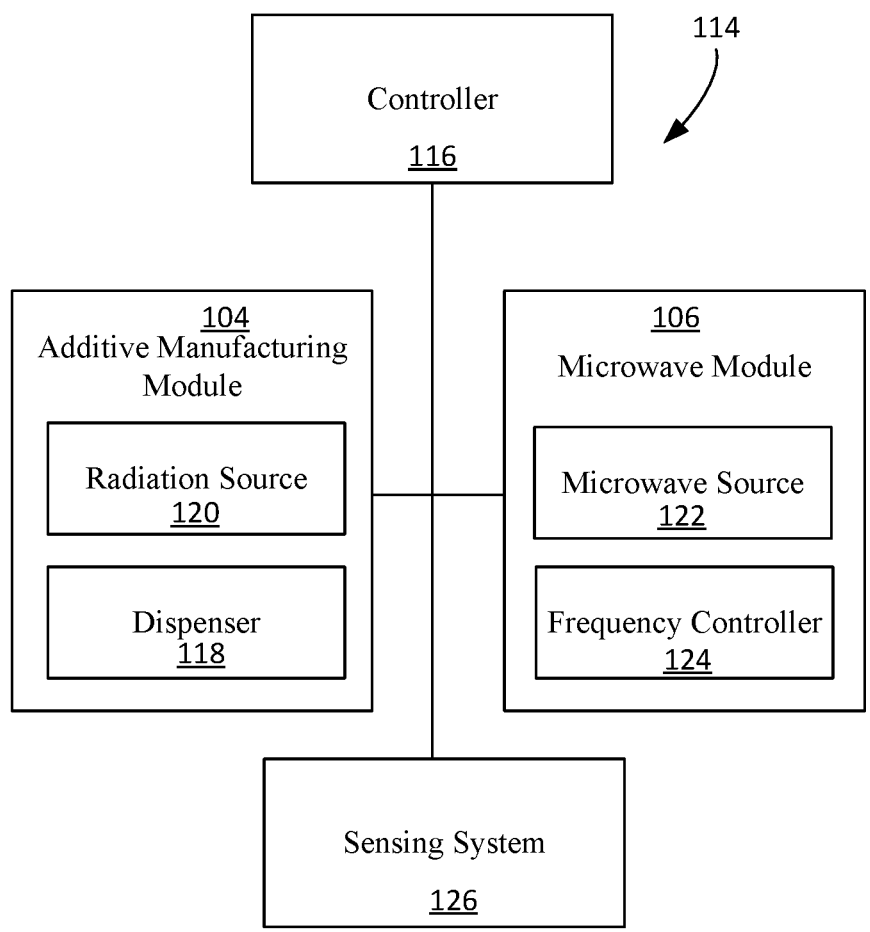
FIG. 2 is a block diagram of systems of an additive manufacturing apparatus.

FIG. 1 shows a schematic side view of an example of an additive manufacturing apparatus 100 that can perform curing and crystallization processes to form a ceramic part. The additive manufacturing apparatus 100 includes an enclosure 102 that houses an additive manufacturing module 104 of the apparatus 100 and a microwave module 106 of the apparatus 100. The additive manufacturing module 104 dispenses and cures successive layers 108 of a feed material 110 on a platform 112. By curing the successive layers 108 of the feed material 110, the additive manufacturing module 104 causes a cured polymer to form. The cured polymer stabilizes the layers 108 of the feed material 110 when they are supported on the platform 112. The microwave module 106 emits microwaves toward the platform 112 to vaporize the cured polymer. The microwaves also cause crystallization of the ceramic component of the feed material 110 to induce formation of a ceramic crystal that defines the ceramic part. Referring to FIG. 2, which depicts a control system 114, a controller 116 of the control system 114 can operate each of the additive manufacturing module 104 and the microwave module 106 to form the ceramic part. The control system 114 is described in greater detail herein.

The enclosure 102 supports the platform 112 and is opaque to the microwaves emitted by the microwave module 106. For example, the enclosure 102 can be a metal mesh that operates as a Faraday cage. As a result, the enclosure 102 serves to separate the microwaves from an environment outside of the enclosure.

As shown in FIGS. 1 and 2, the additive manufacturing module 104 includes a dispenser 118 that dispenses the layers 108 of the feed material 110 over the platform 112. The platform 112 and/or the dispenser 118 is movable with a linear actuator or other drive mechanism that enables the dispenser 118 to move horizontally above the platform 112. Optionally, a vertical position of the platform 112 and/or dispenser 118 is adjustable. A vertical position of the dispenser 118 relative to the platform 112 is thus controllable such that, after each layer 108 of the feed material 110 has been dispensed and cured, the platform 112 can be lowered or the dispenser 118 can be raised so that the platform 112 is ready to receive a new layer 108 of the feed material 110. This, for example, permits the feed material 110 for each layer to be dispensed from the same height above the platform 112.

The dispenser 118 can include an opening through which the feed material 110 is delivered, e.g., by gravity, over the platform 112. In some examples, the dispenser 118 can be connected to a reservoir storing the feed material 110. Release of the feed material 110 can be controlled by a gate. Electronic control signals can be sent to the gate to dispense the feed material 110 when the dispenser 118 is translated to a position specified by a CAD-compatible file. In some examples, the gate of the dispenser 118 can be provided by a piezoelectric print head, and/or one or more of pneumatic valves, microelectromechanical systems (MEMS) valves, solenoid valves, or magnetic valves, to control the release of feed material 110 from the dispenser 118. The opening of the dispenser 118 can be sized and dimensioned according to a viscosity of the feed material 110.

In some implementations, the opening of the dispenser 118 extends across a width of the platform 112 or a usable build area of the platform 112. The dispenser 118, in this case, moves in a forward direction and a backward direction to enable the opening of the dispenser 118 to dispense the feed material 110 along any portion of the usable build area of the platform 112. In some cases, the opening extends only across a part of the width of the platform 112. As a result, the dispenser 118 moves within a horizontal plane, e.g., moves along two perpendicular horizontal axes, above the platform 112 such that the dispenser 118 is able to deposit the feed material 110 within the usable build area of the platform 112.

The dispenser 118 can dispense a feed material 110 that includes a curable component and a ceramic component. The feed material 110 can be a liquid, e.g., entirely liquid or a suspension of particulates in liquid. In some examples, the curable component is a liquid photosensitive polymer. The photosensitive polymer is sensitive to ultraviolet radiation such that, upon emitting the ultraviolet light toward the platform 112, the radiation source 120 cures the photosensitive polymer. The photosensitive polymer can be a UV light curable polymer.

The additive manufacturing module 104 also includes a radiation source 120 that emits a radiation toward the platform 112 to cure the feed material 110. In some implementations, the radiation source 120 is an ultraviolet (UV) light source and the radiation is ultraviolet light. The UV light can have a wavelength between, for example, 10 nm to 400 nm (e.g., 10 to 320 nm, 320 to 400 nm, 320 nm to 360 nm, 340 nm to 380 nm, 380 nm to 400 nm, 350 nm to 370 nm, approximately 355 nm, approximately 365 nm). The wavelength of the UV light selected can correspond to a type of the photosensitive polymer used as the UV light curable polymer.

In some implementations, the additive manufacturing module 104 and/or the dispenser 118 dispenses several voxels of the feed material 110 to form a layer of the feed material 110. When dispensed on the platform 112, each voxel can have a width of, for example, 10 μm to 50 μm (e.g., 10 μm to 30 μm, 20 μm to 40 μm, 30 μm to 50 μm, approximately 20 μm, approximately 30 μm, or approximately 50 μm). Each layer can have a predetermined thickness. The thickness can be, for example, 10 μm to 125 μm (e.g., 10 μm to 20 μm, 10 μm to 40 μm, 40 μm to 80 μm, 80 μm to 125 μm, approximately 15 μm, approximately 25 μm, approximately 60 μm, or approximately 100 μm).

The radiation source 120 can emit the radiation to cure the curable component of the feed material 110 as or after each layer 108 is dispensed by the dispenser 118. In some examples, the radiation source 120 is a laser that cures the curable component as each layer is dispensed by the dispenser 118. The radiation source 120 is, for example, a UV light laser that emits a beam of UV light toward the platform 112. The beam of UV light covers an area of the platform 112 that is smaller than the usable build area of the platform 112. If the radiation source 120 is a UV light laser, the radiation source 120 can emit multiple beams of UV light to cure a single layer of the feed material 110. If the dispenser 118 dispenses multiple portions of the feed material 110 to form a layer of the feed material 110, the radiation source 120 emits a beam of UV light, for example, after the dispenser 118 dispenses each portion of the feed material 110. The portion can be sized, e.g., can include a predetermined number of voxels, such that the area covered by the beam of radiation from the radiation source 120 is larger than an area covered by the predetermined number of voxels.

In other implementations, the radiation source 120, when activated, emits a beam of light that covers an area whose width extends across the usable build area. In other implementations, the radiation source 120, when activated, emits a beam of light that covers the entire usable build area. The radiation source 120 can thus cure the curable component after each layer is dispensed. The radiation source 120 can be, for example, a UV light lamp that emits UV radiation. If the emitted radiation from the radiation source 120 covers the usable build area upon activation of the radiation source 120, the radiation source 120 can be activated after the dispenser 118 dispenses all of the feed material 110 in a layer. If the radiation from the radiation source 120 extends across the width of the build area, the radiation source 120 can be scanned horizontally as the layer 112 is dispensed.

The ceramic component includes one or more materials that can form a ceramic crystal forming the ceramic part. The ceramic component forming the ceramic crystal can be a ceramic compound or one or more precursors for a ceramic compound. For example, the ceramic compound can be a liquid-phase ceramic precursor, or the ceramic compound can be ceramic particulates that will fuse during fabrication. The feed material 110 optionally includes a seed crystal that facilitates crystallization of the ceramic compound forming the ceramic crystal.

In some implementations, the ceramic part is formed from the ceramic material silicon carbide. The dispenser 118 can therefore, in these implementations, dispense a feed material including one or more silicon carbide precursors and/or silicon carbide particles. The silicon carbide precursor can include a liquid-phase silicon carbide precursor. If the ceramic part is formed from silicon carbide, the silicon carbide precursor can include one or more of poly(silylacetylene)siloxane, polymethylsilane, $[SiH_{1.26}(CH_3)_{0.6}(CH_2CH=CH_2)_{0.14}CH_2]_n$, $[SiH_{1.26}(CH_3)_{0.6}(CH_2CH=CH_2)_{0.14}CH_2]_n$, and polytitaniumcarbosilane (HPTiCS).

In some cases, the feed material includes a carbon source and a silicon source that are precursors to the silicon carbide. The carbon source and the silicon sources under proper conditions can form a silicon carbide crystal. The carbon source and the silicon source form the silicon carbide, for example, in the presence of heat. The microwaves, e.g., the microwaves from the microwave module 106, can cause the carbon and silicon sources to react to form a silicon carbide compound or precursor. The microwaves can also cause crystal growth of the resulting silicon carbide compound or the precursor.

The curable component can be about between 1% and 30% by mass (e.g., between 1% and 3% by mass, between 3% and 30% by mass, between 10% and 30% by mass, between 25% and 30% by mass, etc.) of the feed material 110. The ceramic component can be about 10% to 98% by mass (e.g., between 10% and 30% by mass, between 30% and 50%, between 50% and 75% by mass, between 75% and 98% by mass, etc.) of the feed material 110.

The ceramic component that goes on to form the ceramic crystal can be relatively transparent to the radiation from the radiation source 120. In addition, because the curable component includes a photoinitiator sensitive to the radiation from the radiation source, the curing radiation enables the curable component to be cured without inducing a chemical reaction in the ceramic component to crystallization of the ceramic component.

The curable component can be about between 1% and 30% by mass (e.g., between 1% and 3% by mass, between 3% and 30% by mass, between 10% and 30% by mass, between 25% to 30% by mass, etc.) of the feed material 110. The ceramic component can be about 10% to 98% by mass (e.g., between 10% and 30% by mass, between 30% and 50%, between 50% and 75% by mass, between 75% and 98% by mass, etc.) of the feed material 110.

Also shown in FIGS. 1 and 2, the microwave module 106 includes a microwave source 122, controllable by the control system 114, that applies microwaves directed toward the platform 112. The microwaves can vaporize the curable component of the feed material 110. The microwaves can also cause crystallization of the feed material 110 to form the ceramic part.

In some examples, the microwaves vaporize the photosensitive polymer, when the photosensitive polymer is in its cured state. The microwaves cause crystallization of the ceramic component in the feed material 110. The microwaves can cause nucleation of the ceramic component. The microwave source 122, by emitting the microwaves toward the feed material 110, can also cause growth of the ceramic crystal transparent to the microwaves.

To enable the microwaves to vaporize the curable component while inducing formation of the ceramic crystal, the curable component and the ceramic component can be differentially transparent to the microwaves. The ceramic crystal formed during the crystallization can have a transparency to the microwaves 400% to 2000% greater than a transparency to the microwaves of the curable component after the curable component has been cured. In other words, the ceramic crystal can have a transparency to the microwaves 400% to 2000% greater than a transparency to the microwaves of the cured polymer.

The microwaves emitted by the microwave source 122 can be frequency controlled such that the microwaves vary over a range of frequencies. For example, the microwave source 122 can be connected to a frequency controller 124 that modulates the frequencies of the microwaves. In some examples, the frequency controller 124 is part of the controller 116.

The microwave source 122 can be controlled by the frequency controller 124 such that the microwave source 122 sequentially emits the microwaves at each of the frequencies selected between the predetermined range of frequencies. The microwaves can be emitted at, for example, 100 to 5000 different frequencies between the predetermine range of frequencies (e.g., 100 to 3000 different frequencies, 3000 to 5000 frequencies, 4000 to 4200 frequencies, approximately 4096 frequencies). The predetermined range of frequencies can be between 5.8 and 6.8 gigahertz. In some examples, the microwave source 122 emits the microwaves at each of the frequencies for approximately 25 microseconds. In some implementations, the microwave source 122 emits the microwaves at each of the frequencies for 5 to 45 microseconds (e.g., 5 to 25 microseconds, 15 to 35 microseconds, or 25 to 45 microseconds. However, in some examples, the microwaves can also be emitted at a fixed frequency, for example, between 5.8 and 6.8 gigahertz.

In some examples, the microwaves emitted by the microwave source 122 can cause multiple ceramic crystals within a layer of the feed material 110 to form. The microwaves can add sufficient heat to the feed material 110 to vaporize the cured polymer and sinter the multiple ceramic crystals formed during the crystallization process. The multiple ceramic crystals can thus be sintered together to form a solid mass of the ceramic crystals.

In some cases, the microwave source 122 applies microwaves to cover the entire usable build area of the platform 112. In this case, the microwave source 122 can be activated to apply the microwaves after the additive manufacturing module 104 has dispensed and cured all of one or more layers of the feed material 110. Optionally, the microwave source 122 can be activated after the additive manufacturing module 104 has completed one or more layers of the feed material 110 but before the additive manufacturing module has begun dispensing and curing operations of another layer of the feed material 110. In some implementations, the microwave source 122 emits microwaves that cause crystal growth and polymer vaporization through layers underneath the top layer of the feed material 110. In such cases, the microwave source 122 can be activated after multiple layers of the feed material 110 have been dispensed and cured.

In some implementations, the additive manufacturing module 104 and the microwave module 106 are both coupled to linear actuators that move the modules 104, 106 horizontally relative to the platform 112. The platform 112 can be held in a horizontal position within the enclosure 102 as the modules 104, 106 move through the enclosure 102 relative to the platform 112.

The microwave source 122 is movable relative to the platform 112. In some examples, the platform 112 is coupled to a linear actuator that is capable of moving the platform 112 through the enclosure 102. After the additive manufacturing module 104 has dispensed and cured the layers 108, the linear actuator can move the platform 112 from beneath the additive manufacturing module 104 to beneath the microwave module 106 to prepare the layers 108 to receive the microwaves from the microwave module 106.

The microwave source 122 optionally emits the microwaves through a microwave horn 125 to direct the microwaves over the length and width of the platform 112. FIGS. 3A to 3E depict various examples of microwave horns 125a-125e that could be used with the microwave source 122. The microwave horns 125a-125e include a flaring metal waveguide shaped like a horn to direct microwaves in a beam toward the platform 112. The horn 125a-125e can be shaped to guide the microwaves emitted by the microwave source 122 to a portion of the platform 112. The aperture at the end of the flaring metal waveguide can determine the pattern of electric fields (E-field) and magnetic fields (H-fields) at the mouth of the horn 125a-125e. The microwave horns 125a-125e can have different flare angles as well as different expansion curves (e.g., elliptic, hyperbolic, and other expansion curves) in the E-field and H-field directions to enable emission of a range of microwave beam profiles.

Figure 3A:
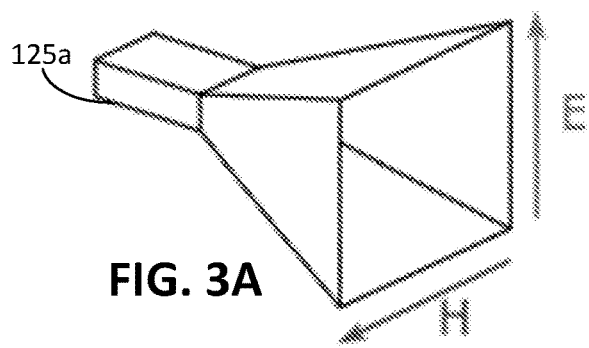
FIGS. 3A to 3E are perspective views of microwave horns for an additive manufacturing apparatus.
Figure 3B:
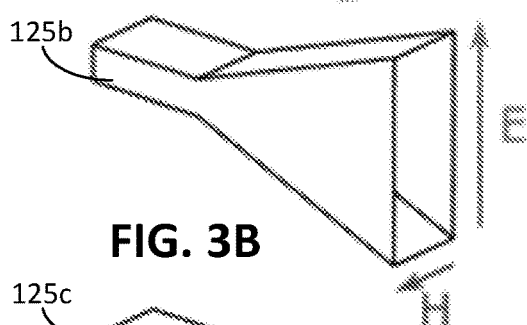
Figure 3C:
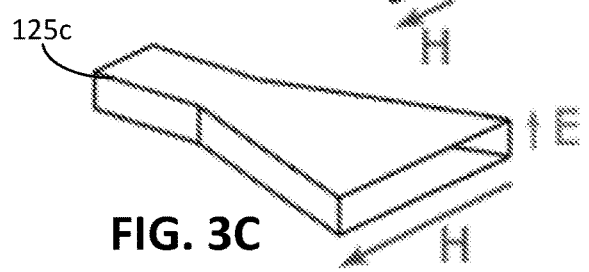
Figure 3D:
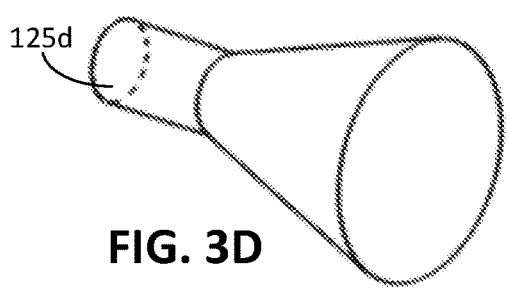
Figure 3E:
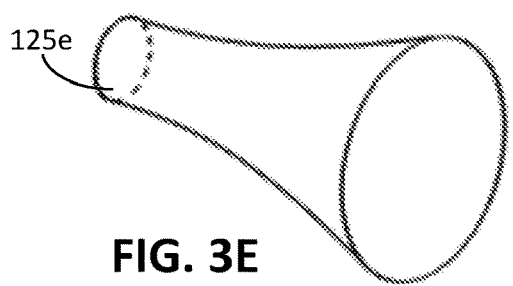

FIG. 3A depicts a pyramidal horn 125a having a shape of a four-sided pyramid with a rectangular cross section that flares outwardly. The pyramidal horn 125a can be used with rectangular waveguides and radiate linearly polarized radio waves. FIG. 3B depicts an E-plane horn 125b that is flared in the direction of the electric or E-field in the waveguide. FIG. 3C depicts an H-plane horn 125c that is a sectoral horn. A sectoral horn is a pyramidal horn with only one pair of sides flared and the other pair parallel. The sectoral horn produces a fan-shaped beam, which is narrow in the plane of the flared sides, but wide in the plane of the narrow sides. The H-plan horn 125c is a sectoral horn flared in the direction of the H-field in the waveguide. FIG. 3D depicts a conical horn 125d the shape of a cone with a circular cross section. The conical horn 125d can be used with cylindrical waveguides. FIG. 3E depicts an exponential or scalar horn 125e with curved sides, in which the separation of the sides increases as an exponential function of length. The scalar horn 125e can have pyramidal or conical cross sections. The scalar horn 125e can have minimum internal reflections, almost constant impedance, and other characteristics over a wide frequency range.

Optionally, the apparatus 100 also includes a sensing system 126 that detects properties of the feed material 110 as the feed material 110 undergoes the various processes performed by the additive manufacturing module 104 and the microwave module 106. The sensing system 126 can include an optical sensor 128. The sensor 128 is, for example, an infrared radiation sensor 128 that detects infrared radiation emitted by the feed material 110 on the platform 112. The sensor 128 determines, for example, a temperature of the layers 108 of the feed material 110 to enable the control system 114 to monitor the operations of the modules 104, 106. In some examples, the sensor 128 is an infrared emitter and detector that can be used to determine the surface texture of the feed material 110 on the platform 112.

In some implementations, the apparatus 100 includes a window 130 along the enclosure 102 that enables optical monitoring of the feed material 110. The window 130 can be, for example, a quartz window with a conductive mesh that provides a faraday cage. This enables the window 130 to be opaque to the microwaves emitted by the microwave module 106. While the quartz is transparent to the microwaves, the faraday cage prevents the microwaves from travelling through the window 130. In this regard, the window 130 allows for optical monitoring without allowing microwaves to escape into the environment outside of the apparatus 100. In some examples, the optical sensor 128 is positioned outside of the enclosure 102 and is able to emit an optical signal towards the platform 112 through the window 130. Thus, the window 130 can be transparent to the optical signal emitted by the optical sensor 128 but be opaque to the microwaves emitted by the microwave module 106. The window 130 is, for example, transparent to infrared light emitted by the optical sensor.

The controller 116 operates the additive manufacturing module 104 to dispense and cure multiple layers 108 of the feed material 110, thereby forming an intermediate state of the layers 108 of the feed material 110. In this intermediate state, the layers 108 of the feed material 110 include the cured polymer that stabilizes a structure and geometry of the feed material 110. The controller 116, after the multiple layers 108 are dispensed and cured, operates the microwave module 106 to vaporize the cured polymer and to cause crystallization of the feed material 110. Because the cured polymer is vaporized, a ceramic crystal formed from the crystallization of the feed material 110 remains after the controller 116 operates the microwave module 106. For a given layer, the remaining ceramic crystal forms a portion of the ceramic part.

In some implementations, the control system 114 uses a computer-aided design (CAD)-compatible file to control the additive manufacturing module 104 and/or the microwave module 106 to form the ceramic part. For example, the additive manufacturing module 104 can selectively dispense the feed material 110 at predetermined locations on the platform 112 according to a printing pattern that can be stored in a non-transitory computer-readable medium as a CAD-compatible file. In some cases, the additive manufacturing module 104 can selectively cure the feed material at predetermined locations on the platform 112 based on the printing pattern determined in the CAD-compatible file. Optionally, the microwave module 106 also applies the microwaves in accordance to instructions from the CAD-compatible file.

Methods of Using the Additive Manufacturing Apparatuses

Figure 4:
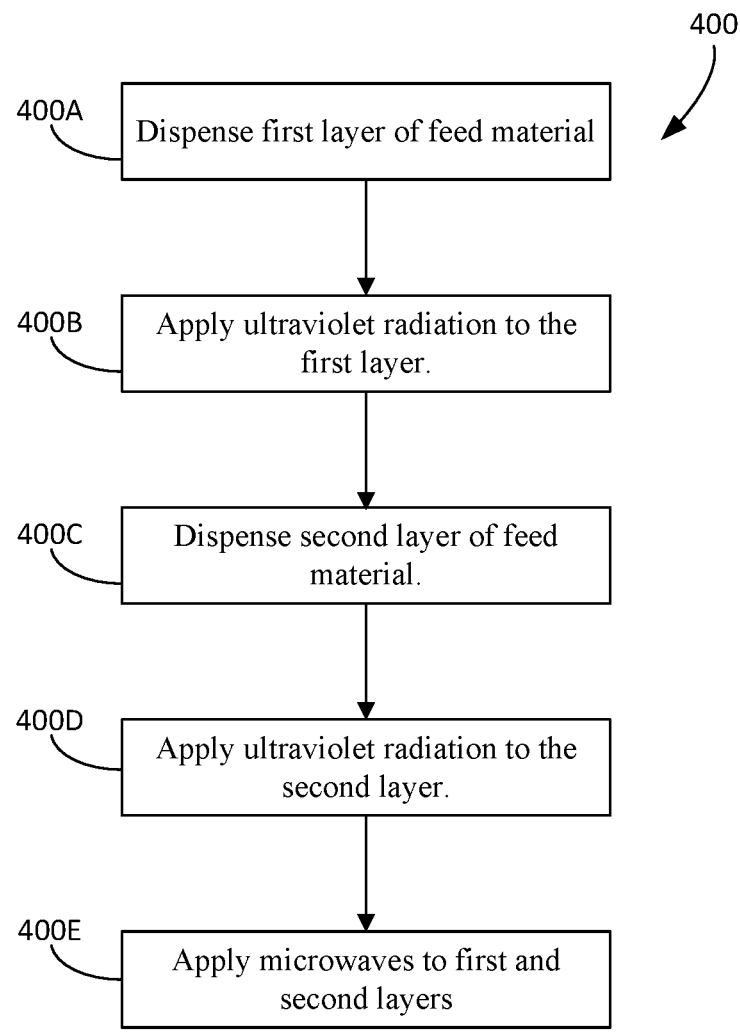
FIG. 4 is a flowchart of an example of an additive manufacturing process performed using an additive manufacturing apparatus.

The additive manufacturing apparatus 100 and other apparatuses described herein can perform additive manufacturing processes to create ceramic parts. The control system 114, for example, controls operations of the additive manufacturing module 104, the microwave module 106, and the platform 112 to dispense, cure, and crystallize the feed material 110. In some examples, the control system 114 can control the operations of the dispenser 118, the radiation source 120, and the microwave source 122. FIG. 4 is a flowchart depicting a process 400 to dispense, cure, and crystallize feed material. The process 400 is implemented by, for example, the control system 114 to control the additive manufacturing apparatus 100 to dispense, cure, and crystallize the feed material 110.

The process 400 begins with a first layer of feed material being dispensed (400A). For example, at operation 400A, the control system 114 operates the additive manufacturing module 104 to dispense (400A) a layer of the feed material 110. The control system 114 can control the dispenser 118 of the additive manufacturing module 104 to dispense the layer of the feed material 110. The first layer of the feed material 110 can be uniformly dispensed (400A) on the platform 112.

The first layer of the feed material is then cured through application (400B) of ultraviolet light. The control system 114, for example, operates the additive manufacturing module 104 to emit the ultraviolet light toward the platform 112 to cause the first layer of the feed material 110 dispensed at operation 400A to be cured, thereby stabilizing the feed material 110. The control system 114 can activate the radiation source 120 of the additive manufacturing module 104 to emit the radiation to cure the curable component of the feed material 110.

A second layer of feed material is then dispensed (400C). The control system 114 continues controlling the additive manufacturing module 104 to dispense (400C) the layer of the feed material 110 by controlling the dispenser 118. Prior to dispensing (400C) the second layer, the control system 114 can control an actuator coupled with the platform 112 and/or the dispenser 118 to change the vertical position of the dispenser 118 relative to the platform 112. In particular, the control system 114 can control the actuator to increase the distance between the dispenser 118 and the platform 112 so that the dispenser 118 can be positioned above the first layer dispensed and can dispense the second layer on top of the first layer.

In some examples, the dispensing operation 400A and the applying operation 400B can be repeated several times before the dispensing operation 400C is executed. For example, if the radiation source 120 is a UV light laser, the control system 114 can sequentially execute the dispensing operation and the applying operation 400B to dispense and cure a portion of the first layer of the feed material 110. Repetition of these operations 400A, 400B enables the control system 114 to operate the additive manufacturing module 104 to dispense and cure the entire first layer of the feed material 110. For example, the dispenser 118 can dispense a predetermined number of voxels of the feed material 110, and the predetermined number of voxels of the feed material 110 can form a portion of the layer of the feed material 110. The portion of the layer of the feed material 110 can have an area sufficiently small such that the beam of light from the radiation source 120 can cover the entire area. In some examples, the radiation source 120 emits a beam of light covering the entire usable build area. In such cases, the control system 114 executes the dispensing operation 400A to dispense an entire first layer of the feed material 110, and then executes the applying operation 400B to cure the entire first layer of the feed material 110 at once.

After the second layer of the feed material is dispensed (400C), UV radiation is then applied (400D) to the second layer of the feed material. Similar to the applying operation 400B, the applying operation 400D can include operation of the additive manufacturing module 104 and/or the radiation source 120.

In some examples, the radiation emitted by the radiation source 120 can induce the curing process of the feed material 110 in the top layer as well as layers underlying the top layer. As a result, instead of sequentially executing the first dispensing operation 400A, the first applying operation 400B, the second dispensing operation 400C, and the second applying operation 400D, the control system 114 controls the additive manufacturing module 104 to sequentially execute the first and second dispensing operations 400A and 400C. The control system 114 then performs a single applying operation 400B, 400D that cures the feed material 110 in both the first and second layers of the feed material, e.g., simultaneously.

After the first layer and the second layer of the feed material 110 is dispensed (400A, 400C) and the ultraviolet light is applied (400B, 400D) to cure the first and second layers, microwaves are applied (400E) to the first and second layers. The control system 114, for example, operates the microwave module 106 to emit the microwaves toward the platform 112. The microwaves, as described above, cause crystallization of the ceramic component of the feed material 110 and vaporization of the curable component of the feed material 110. The control system 114 can therefore cause the dispenser 118 to dispense (400A, 400C) at least two layers of the feed material 110 between each application (400E) of the microwaves. The microwaves can thus vaporize the curable component of the two or more layers of the feed material 110 simultaneously, and crystallize the ceramic component of the two or more layers of the feed material 110 simultaneously. The crystallization of the ceramic component leads to formation of the ceramic crystals that form the ceramic part.

In some examples, the operations 400A to 400D use the additive manufacturing module 104 and the operation 400E uses the microwave module 106. Thus, in operations 400A to 400D, the control system 114 can control the platform 112, the additive manufacturing module 104, and the microwave module 106 such that the additive manufacturing module 104 may dispense the feed material 110 on the platform 112 and direct UV light toward the platform 112. While the additive manufacturing module 104 is able to dispense the feed material 110 and direct the UV light toward the platform 112, the microwave module 106 can be positioned relative to the platform 112 to be unable to emit the microwaves toward the platform 112. The control system 114 can, for example, control one or more linear actuators coupled to one or more of the dispenser 118 and/or the radiation source 120, the platform 112, and the microwave source 122. In these cases, in preparation for operation 400E, the control system 114 may operate the modules 104, 106 and/or the platform 112 such that the microwave module 106 can emit the microwaves toward the platform 112. The additive manufacturing module 104 can also be positioned relative to the platform 112 such that the additive manufacturing module 104 is unable to dispense and cure the feed material 110 on the platform 112.

In the process 400 depicted in FIG. 4, the microwaves are applied (400E) after multiple layers are dispensed and cured. In some examples, the microwaves are applied after each layer of the feed material 110 is dispensed and cured.

In some examples, the ceramic part is formed from two layers of the feed material 110, and thus, only the operations 400A to 400E may be necessary. While only operations 400A to 400E are shown, the process 400 can be repeated multiple times such that more than two layers of the feed material 110 can be dispensed, cured, and crystallized. The dispensing (400A, 400C), applying UV light (400B, 400D), and applying microwaves (400E) operations can be repeated to create a ceramic part formed from three or more layers of the feed material 110.

In some examples in which three or more layers of the feed material 110 are dispensed and cured, the control system 114 can control the additive manufacturing module 104 to dispense and cure the curable component of each of the layers of the feed material 110. After dispensing and curing the feed material 110 for all of the layers to be dispensed, the control system 114 can then control the microwave module 106 to apply the microwaves to vaporize the curable component of all of the layers simultaneously. The microwaves, in this case, can thus be capable of penetrating through the top layer and at least two layers beneath the top layer.

In some implementations of the additive manufacturing apparatus 100, as described herein, the additive manufacturing module 104 and the dispenser 118 can dispense a single type of feed material 110 on the platform 112. Optionally, the additive manufacturing module 104 and the dispenser 118 dispense an additional type of feed material. The dispenser 118 can dispense both the first feed material and the second feed material. The first feed material can be dispensed from a first opening of the dispenser 118, and the second feed material can be dispensed from a second opening of the dispenser 118.

The two feed materials each includes the curable component and the ceramic component. The first and second feed materials differ in that the first feed material may include a greater density of the ceramic component than density of the ceramic component in the second feed material. The ratio of the ceramic component to the curable component in the first feed material differs from the ratio of the ceramic component to the curable component in the second feed material. In some examples, the ratio of the first feed material is 600% to 1000% greater than the ratio of the second feed material.

In the first feed material, the ratio of the curable component to the ceramic component by mass can be between 1 to 10 and 1 to 3. In the second feed material, the ratio of the curable component to the ceramic component by mass can be between 1 to 3 and 1 to 1. The ratio of the curable component to the ceramic component in the first feed material can be between 10% and 1000% (e.g., between 10% and 200%, between 200% and 600%, between 600% and 1000%) greater than the ratio of the curable component to the ceramic component in the second feed material.

In some examples, the ceramic component of the first feed material includes polymethylsilane and the ceramic component of the second feed material includes $[CH_3(CH\!=\!CH)SiO]_4$. In some examples, the ceramic component of the first feed material includes $[SiH_{1.26}(CH_3)_{0.6}(CH_2CH\!=\!CH_2)_{0.14}CH_2]_n$, and the ceramic component of the second feed material includes $Cp_2TiCl_2$ and/or vinyl ferrocene.

If only one feed material is used, the feed material can include ceramic crystal seeds to increase the rate of crystallization and improve uniformity of crystallization. If more than one feed material is used, optionally, one or both of the feed materials include ceramic crystal seeds. The two feed material can include a different density of ceramic crystal seeds. The first feed material dispensed in the first and third layers can have a greater density of ceramic crystal seeds than the density of the ceramic crystal seeds of the second feed material dispensed in the second layer. In some implementations, the first feed material includes ceramic crystal seeds, while the second feed material does not include ceramic crystal seeds.

Figure 5A:
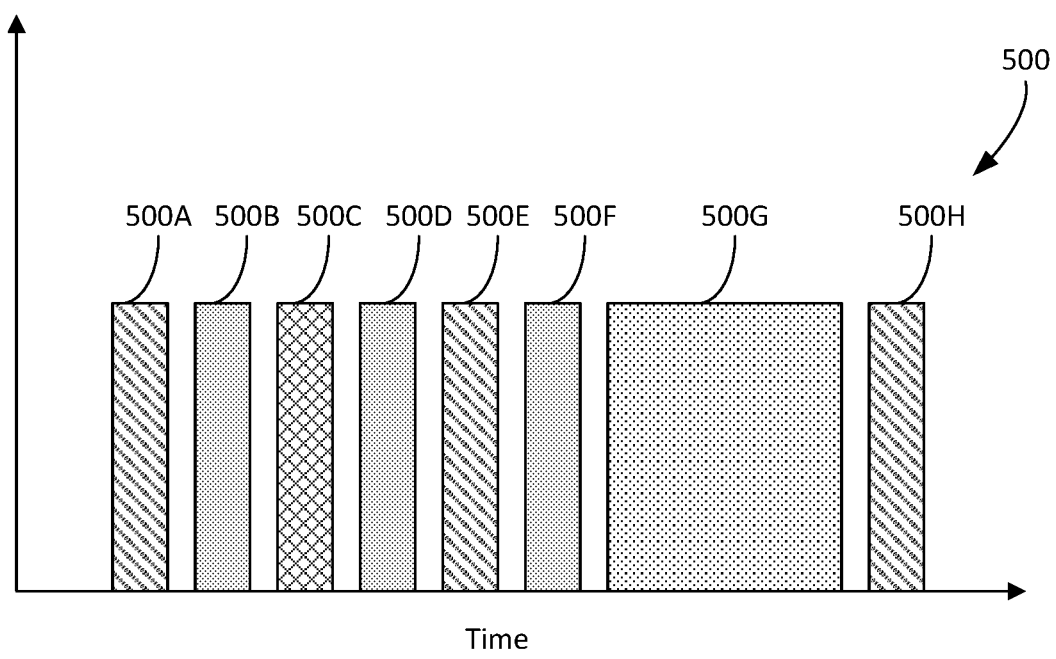
FIG. 5A is a graph depicting operations of an example of an additive manufacturing process performed using an additive manufacturing apparatus.
Figure 5B:
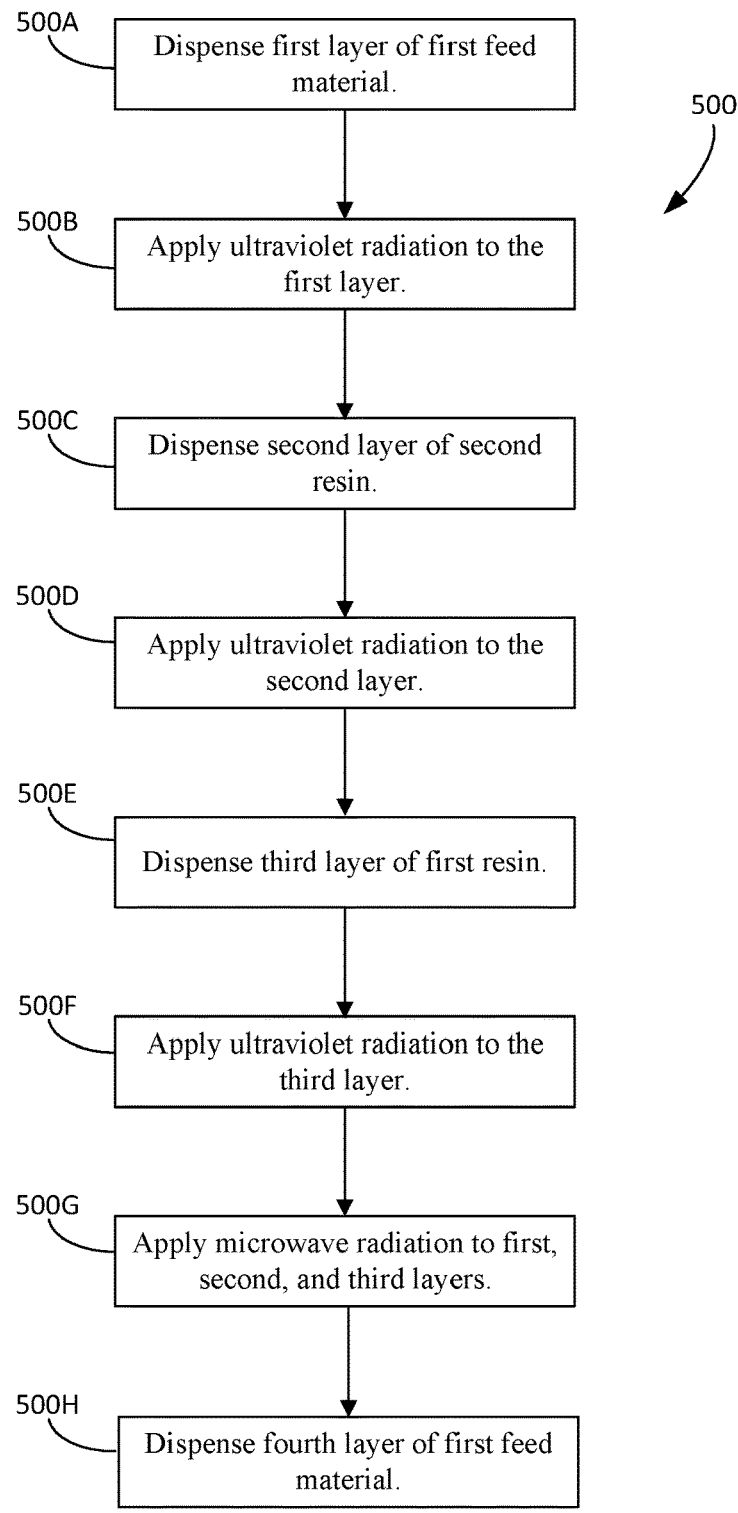
FIG. 5B is a flowchart of the additive manufacturing process depicted in FIG. 5A.

Because the first feed material has a proportion of the ceramic component greater than a proportion of the ceramic component in the second feed material, crystallization of the first feed material can lead to ceramic crystals larger than ceramic crystals formed from crystallization of the second feed material. The additive manufacturing apparatus 100 may utilize the difference in grain sizes between the ceramic crystals of the first and second feed materials to promote bonding and sintering between layers of the feed materials. Heterogeneity of the grain sizes between layers can improve strengths of bonds between the layers of the feed materials. FIGS. 5A and 5B show an example of a process 500 that uses two types of feed materials. In particular, FIG. 5A schematically depicts a graph of dispensing and applying operations and a relative duration of time for execution of each of these operations. FIG. 5B shows a flowchart of the process 500.

The process 500 begins with a first layer of feed material is dispensed (500A). The first layer is formed from the first feed material. UV radiation is then applied (500B) to the first layer of the first feed material. A second layer of feed material is then dispensed (500C). The second layer is formed from the second feed material. UV radiation is then applied (500D) to the second layer of the second feed material. Finally, a third layer of feed material is dispensed (500E), the third layer being formed from the first feed material. The UV radiation is then applied (500F) to the third layer of the first feed material. At operation 500G, microwaves are applied to cause crystallization of the ceramic component in the feed materials in each of the first, second, and third layers. The dispensing operations 500A, 500C, 500E are similar to the dispensing operations 400A, 400C described herein, except the feed material dispensed in the dispensing operation 500C differs from the feed material dispensed in the operations 500A, 500E, whereas the feed material dispensed in the operations 400A, 400C are the same.

As shown in FIG. 5A, the operation time for each of these operations 500A to 500F can be similar. The operation time of the operation 500G may be relatively longer than the operation time of each of the operation times of the operations 500A to 500F. Because the operations 500A to 500F are each limited to dispensing and curing feed material in a single layer while the operation 500G entails application of microwaves to multiple layers, the operation 500G may require a longer operation time so that the microwaves can cause sufficient crystallization within each of the first, second, and third layers. The operation time of the operation 500G may be two to forty times longer than the operation time of each of the operations 500A to 500F. In some examples, the duration of the time that the UV radiation is applied can be between 0.1 seconds per 0.01 square meter per layer and 1 second per 0.01 square meter per layer. In some cases, the duration of time that the microwaves are applied do not depend on the number of layers. The duration of time can be, for example, between 1 seconds and 20 seconds.

The sequential operations 500A to 500F enables the second layer formed from the second feed material to be sandwiched between two layers formed from the first feed material. In particular, the first layer of the first feed material (dispensed and cured in the operations 500A and 500B) is below the second layer of the second feed material (dispensed and cured in the operations 500C and 500D). The third layer of the first feed material (dispensed and cured in the operations 500E and 500F) is above the second layer of the second feed material. This arrangement of the two feed materials results in a layer of feed material having a lower density of the ceramic component positioned between two layers of higher density of the ceramic component.

When the microwave source 122 applies (500G) the microwaves to the first, second and third layers, the microwave source 122, by applying the microwaves, can cause crystallization of the ceramic components of the first and second feed materials, thereby causing crystallization in each of the first, second, and third layers. The layer having the lower density of the ceramic component, i.e., the second layer, forms a smaller ceramic crystal relative to the ceramic crystals formed in the two layers having the higher density of the ceramic component, i.e., the first and third layers. The ceramic crystals formed in the first and third layers are, for example, 300% to 2000% larger than the ceramic crystals formed in the second layer (e.g., 300% to 1200%, 400% to 2000%, 1200% to 2000% larger than the ceramic crystals formed in the second layer). The ratio of the sizes of the ceramic crystals can depend on the difference in density of the ceramic component in the first and second feed materials.

The microwaves, in addition to causing crystallization, can also cause sintering between the ceramic crystals. The ceramic crystal or crystals formed in the second layer can be sintered to the ceramic crystal or crystals formed in the first and third layers due to the application of the microwaves. The smaller grain size of the ceramic crystals formed in the second layer relative to the grain size of the ceramic crystals formed in the first and third layers results can result in stronger bonds between ceramic crystals. In particular, the smaller grain size can result in the ceramic crystals being more closely packed, thus facilitating stronger bonds between the crystals when they are sintered.

After the first, second, and third layers are dispensed, cured, and crystallized at operations 500A to 500G, these operations can be repeated to dispense, cure, and crystallize additional layers. As depicted in FIGS. 5A and 5B, if the process 500 includes these additional layers, the process 500 can include operation 500H to begin dispensing another layer of the first feed material. The process 500 can then proceed with operations similar to the operations 500B to 500G in which the new layer is cured, subsequent layers are dispensed and cured, and each of the new layers are exposed to the microwaves.

Controllers and computing devices can implement the processes 400 and 500, the operations 400A to 400E, 500A to 500H, and other processes and operations described herein. In some implementations, the control system 114 and the controller 116 of the apparatus 100 can include one or more processing devices connected to the various components of the apparatus 100, e.g., the dispenser 118, the radiation source 120, the microwave source 122, and/or actuators connected to these systems, to generate control signals for those components. The control system 114, the controller 116, and other processors and controllers of the apparatus 100 can coordinate the operations and cause the apparatus 100 to carry out the various functional operations or sequence of steps described above. These processors and controllers can control the movement and operations of the additive manufacturing module 104, the microwave module 106, and other systems of the apparatus 100.

The control system 114, the controller 116, and other computing devices part of systems described herein can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

The control system 114, the controller 116, and other computing devices part of systems described can include non-transitory computer readable medium to store a data object, e.g., a CAD-compatible file that identifies the pattern in which the feed material should be deposited for each layer. For example, the data object could be a STL-formatted file, a 3D Manufacturing Format (3MF) file, or an Additive Manufacturing File Format (AMF) file. For example, the controller could receive the data object from a remote computer. A processor in the control system 114, e.g., as controlled by firmware or software, can interpret the data object received from the computer to generate the set of signals necessary to control the components of the apparatus 100 to fuse the specified pattern for each layer.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The ceramic part formed from the processes and operations described herein can be a ceramic wafer. In some examples, the ceramic part is a silicon carbide monolith, a tungsten carbide monolith, or other ceramic monolith.

The ceramic part can provide the conditioning disk for a system for conditioning a polishing pad. The conditioning disk can be embedded or coated with diamond particles that serve as an abrasive to improve the pad's ability for polishing or conditioning. The shape of the conditioning disk, e.g., location and curvature of any cutting edges, can be set by the 3D printing process. In addition, the surface texture of the bottom surface of the conditioning disk, e.g., the surface roughness or the presences of cutting features on the bottom surface of the disk, can be fabricated through the 3D printing process.

In some implementations, the additive manufacturing apparatus 100 includes a heat source that can add heat to the feed material on the platform 112. The heat source can be a heat lamp that emits heat toward the feed material to uniformly heat the feed material. The heat source can alternatively or additionally be coupled to the platform 112 to impart heat to any feed material dispensed on the platform 112. The additional heat from the heat source can increase the rate of curing when the curing radiation is applied to the feed material 110. The additional heat can also be used to increase the rate of sintering and/or crystallization when the microwaves are applied to the feed material 110.

In some examples, the enclosure 102 is configured to hold an inert gas, such as nitrogen gas. The apparatus 100 can include a gas system that circulates gas into and out of the enclosure 102. When the feed material 110 is dispensed on the platform 112, the gas can improve crystallization processes to reduce defects in crystal formation and hence improve uniformity of crystal growth of the ceramic component of the feed material 110.

Silicon carbide is an example of a ceramic material that can form the ceramic part created using the processes and operations described herein. Other examples of ceramic materials include metal oxide, such as ceria, alumina, silica, aluminum nitride, silicon nitride, or a combination of these materials. The feed material 110 can be dry ceramic particles combined with a curable component. The feed material 110 can be ceramic powders in liquid suspension, or a slurry suspension of a material. The dispenser 118 can deliver the combination of the ceramic compound or the ceramic precursor and the curable component in a carrier fluid, e.g. a high vapor pressure carrier, e.g., Isopropyl Alcohol (IPA), ethanol, or N-Methyl-2-pyrrolidone (NMP). The carrier fluid can evaporate prior to application of the microwaves or prior to application of the curing radiation.

A number of implementations have been described. Nevertheless, it will be understood that various modifications may be made. For example,
while two separate modules—the additive manufacturing module 104 and the microwave module 106—have been described, in some examples, the apparatus can be configured such that the platform need not be moved between the modules for the application of curing radiation and microwaves. The platform 112 can have a fixed horizontal position relative to the dispenser 118, the radiation source 120, and the microwave source 122.

the dispenser 118, the radiation source 120, and the microwave source 122 can be positioned within a single module or print head movable to different positions above the platform 112.

the sensing system 126 can include other appropriate sensors to monitor the feed material 110. The sensing system 126 can include, for example, an optical sensor that tracks grain size of the ceramic crystals as they crystallize in response to exposure to microwaves. The sensing system 126 can alternatively or additionally include a thermocouple that detects a temperature of the platform 112.

Accordingly, other implementations are within the scope of the claims.

What is claimed is:

1. An additive manufacturing apparatus for forming a ceramic part, the apparatus comprising:
    a platform to support the ceramic part to be formed;
    a dispenser to dispense a plurality of successive layers of feed material over the platform, the feed material comprising a curable component and a ceramic component;
    a radiation source to emit a radiation toward a top surface of the platform, the radiation being configured to cure the curable component of the feed material as or after each layer is dispensed to form a cured polymer; and
    a microwave source to apply microwaves directed toward the successive layers on the platform;
    a controller coupled to the microwave source having non-transitory computer readable media and/or circuitry that in operation causes the microwave source to generate microwaves that vaporize the cured polymer of the feed material and to cause crystallization of the ceramic component of the feed material to form the ceramic part.

2. The apparatus of claim 1, wherein the controller has non-transitory computer readable media and/or circuitry that in operation causes the dispenser to dispense at least two layers of feed material between each application of the microwaves such that the microwaves vaporize the cured polymer of the at least two layers of feed material simultaneously.

3. The apparatus of claim 1, wherein the controller has non-transitory computer readable media and/or circuitry that in operation causes the microwave source to apply microwaves to vaporize simultaneously the cured polymer of the successive layers of the feed material after causing the dispenser to dispense all of the successive layers of the feed material.

4. The apparatus of claim 1, wherein the controller has non-transitory computer readable media and/or circuitry that in operation causes the microwave source to apply microwaves to cause growth of a ceramic crystal transparent to the microwaves to form the ceramic part.

5. The apparatus of claim 1, wherein the microwave source is configured to emit the microwaves at a plurality of frequencies, the microwave source being configured to sequentially emit the microwaves at each of the plurality of frequencies.

6. The apparatus of claim 1, wherein the radiation source is an ultraviolet (UV) light source and the radiation is ultraviolet light.

7. The apparatus of claim 1, wherein the ceramic component comprises a liquid-phase ceramic compound.

8. The apparatus of claim 1, wherein the feed material is a first feed material, the curable component is a first curable component, the ceramic component is a first ceramic component, and the dispenser is configured to dispense the first feed material and a second feed material on the top surface of the platform, the second feed material comprising a second ceramic component and a second curable component.

9. The apparatus of claim 8, wherein the microwave source is configured to crystalize the first ceramic component of the first feed material to form first ceramic crystals and to crystalize the second ceramic component of the second feed material to form second ceramic crystals, the first ceramic crystals being larger than the second ceramic crystals.

10. The apparatus of claim 8, wherein a ratio of the first ceramic component to the first curable component in the first feed material is greater than a ratio of the second ceramic component to the second curable component in the second feed material.

11. The apparatus of claim 8, wherein the controller has non-transitory computer readable media and/or circuitry that in operation causes the apparatus to
    dispense, using the dispenser, a first layer of the first feed material on the top surface of the platform;
    cure, using the radiation source, the first layer of the first feed material;
    dispense, using the dispenser, a second layer of the second feed material on the first layer;
    cure, using the radiation source, the second layer of the second feed material;
    dispense, using the dispenser, a third layer of the first feed material on the second layer;
    cure, using the radiation source, the third layer of the first feed material; and
    sinter, using the microwave source, a plurality of layers comprising at least the first, second, and third layers.

12. The apparatus of claim 1, further comprising an enclosure opaque to the microwaves, the enclosure supporting the platform and separating the microwaves emitted by the microwave source from an environment.

13. The apparatus of claim 12, further comprising a window opaque to the microwaves and transparent to at least infrared light.

14. The apparatus of claim 13, further comprising an infrared thermal sensor to emit infrared radiation through the window toward the top surface of the platform, the infrared thermal sensor being configured to detect a temperature of the feed material on the platform.

15. The apparatus of claim 1, further comprising a horn coupled to the microwave source, the horn being shaped to guide the microwaves emitted by the microwave source to a portion of the top surface of the platform.

16. The apparatus of claim 1, wherein the ceramic component comprises one or more precursors of a ceramic compound.

* * * * *

UNITED STATES PATENT AND TRADEMARK OFFICE
CERTIFICATE OF CORRECTION

PATENT NO. : 10,518,438 B2
APPLICATION NO. : 15/467541
DATED : December 31, 2019
INVENTOR(S) : Zeng Jie Page 1 of 1

It is certified that error appears in the above-identified patent and that said Letters Patent is hereby corrected as shown below:

In the Claims

Column 19, Line 41, in Claim 1, after "and" delete "to".

Signed and Sealed this
Tenth Day of March, 2020

Andrei Iancu
*Director of the United States Patent and Trademark Office*